US012631827B2

(12) United States Patent
Arbore et al.

(10) Patent No.: US 12,631,827 B2
(45) Date of Patent: May 19, 2026

(54) BROADBAND CONTROLLABLE OPTICAL PHASE SHIFTERS

(71) Applicant: Apple Inc., Cupertino, CA (US)

(72) Inventors: Mark A. Arbore, Los Altos, CA (US); Jason S. Pelc, Sunnyvale, CA (US)

(73) Assignee: APPLE, INC., Cupertino, CA (US)

( * ) Notice: Subject to any disclaimer, the term of this patent is extended or adjusted under 35 U.S.C. 154(b) by 380 days.

(21) Appl. No.: 18/229,872

(22) Filed: Aug. 3, 2023

(65) Prior Publication Data

US 2024/0061280 A1 Feb. 22, 2024

Related U.S. Application Data

(60) Provisional application No. 63/399,943, filed on Aug. 22, 2022.

(51) Int. Cl.
| | |
|---|---|
| *G02B 6/35* | (2006.01) |
| *G02B 6/293* | (2006.01) |
| *G02F 1/01* | (2006.01) |

(52) U.S. Cl.
CPC ....... *G02B 6/3536* (2013.01); *G02B 6/29331* (2013.01); *G02F 1/0128* (2013.01); *G02F 1/0118* (2013.01); *G02F 2201/063* (2013.01)

(58) Field of Classification Search
CPC . G02B 6/29331; G02B 6/3536; G02F 1/0118; G02F 1/0128
USPC ............................................. 385/1–4, 25, 30
See application file for complete search history.

(56) References Cited

U.S. PATENT DOCUMENTS

| | | | | |
|---|---|---|---|---|
| 5,091,983 | A | * | 2/1992 | Lukosz ................... G02F 1/295 |
| | | | | 250/231.19 |
| 6,374,001 | B1 | | 4/2002 | Bozeat et al. |
| 6,879,751 | B2 | * | 4/2005 | Deliwala .............. G02B 6/3536 |
| | | | | 385/25 |
| 6,891,985 | B2 | | 5/2005 | Deliwala |
| 7,747,122 | B2 | | 6/2010 | Shetrit et al. |
| 8,532,440 | B2 | | 9/2013 | Ushida et al. |
| 8,559,769 | B2 | | 10/2013 | Rasras |
| 8,873,895 | B2 | | 10/2014 | Fujikata et al. |
| 9,229,251 | B2 | | 1/2016 | Akiyama et al. |

(Continued)

FOREIGN PATENT DOCUMENTS

| | | |
|---|---|---|
| CA | 2725883 | 11/2013 |
| EP | 0968455 | 1/2008 |

(Continued)

OTHER PUBLICATIONS

Witzens, "High-Speed Silicon Photonics Modulators," Proceedings of the IEEE, vol. 106, No. 12, Dec. 2018, pp. 2158-2182.

*Primary Examiner* — Robert Tavlykaev
(74) *Attorney, Agent, or Firm* — Brownstein Hyatt Farber Schreck, LLP

(57) ABSTRACT

Various embodiments disclosed herein describe optomechanical phase shifters. The optomechanical phase shifters may be configured with an asymmetry that improves the performance of the OM phase shifter as a function of wavelength. In some instances, the optomechanical phase shifter includes a section of a waveguide having an asymmetric cross-sectional shape. In other instances an optomechanical phase shifter is incorporated into a controllable optical switch, such that OM phase shifters may be actuated to selectively route light to different outputs of the controllable optical switch.

19 Claims, 13 Drawing Sheets

(56)        References Cited

U.S. PATENT DOCUMENTS

| | | | |
|---|---|---|---|
| 10,996,539 B2 | 5/2021 | Takahashi et al. | |
| 11,226,504 B2 | 1/2022 | O'Keefe et al. | |
| 11,275,261 B2 | 3/2022 | Takahashi et al. | |
| 2002/0094186 A1 | 7/2002 | Wu | |
| 2003/0003736 A1 | 1/2003 | Delwala | |
| 2004/0120638 A1* | 6/2004 | Frick .................... | G02B 6/1225 |
| | | | 385/27 |
| 2009/0238515 A1* | 9/2009 | Fattal ................. | G02B 6/12007 |
| | | | 385/30 |
| 2012/0063714 A1 | 3/2012 | Park et al. | |
| 2014/0233878 A1 | 8/2014 | Goi et al. | |
| 2016/0004104 A1 | 1/2016 | Feng et al. | |
| 2016/0313577 A1 | 10/2016 | Sun et al. | |
| 2017/0155452 A1 | 6/2017 | Nagra et al. | |
| 2021/0018681 A1* | 1/2021 | Picard .................. | G02B 6/2813 |
| 2022/0197012 A1* | 6/2022 | Han .......................... | G02B 6/26 |
| 2023/0055779 A1* | 2/2023 | Pruessner ................ | G02B 6/14 |
| 2023/0152662 A1 | 5/2023 | Doerr | |
| 2023/0420919 A1 | 12/2023 | Lauer et al. | |
| 2024/0094566 A1 | 3/2024 | Pelc et al. | |
| 2024/0280842 A1 | 8/2024 | Pelc et al. | |

FOREIGN PATENT DOCUMENTS

| | | | | |
|---|---|---|---|---|
| KR | 10-0779091 | 11/2007 | | |
| KR | 10-2009-0059709 | 6/2009 | | |
| KR | 10-2012-0026318 | 3/2012 | | |
| WO | WO 2002/031555 | 4/2002 | | |
| WO | WO 2005/101115 A1 * | 10/2005 | .............. | G02B 6/34 |

* cited by examiner

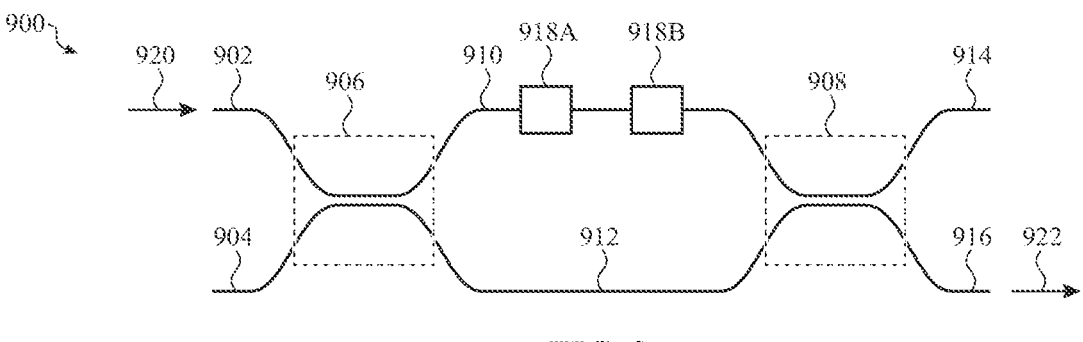
FIG. 9A
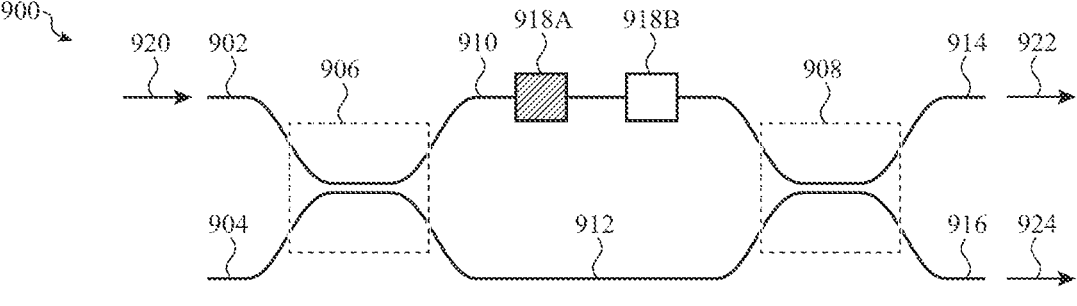
FIG. 9B
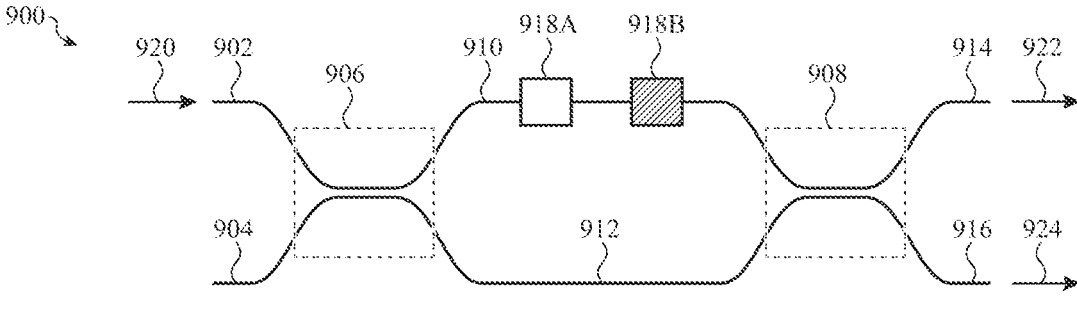
FIG. 9C
FIG. 9D

BROADBAND CONTROLLABLE OPTICAL PHASE SHIFTERS

CROSS-REFERENCE TO RELATED APPLICATION

This application is a nonprovisional and claims the benefit under 35 U.S.C. 119(e) of U.S. Provisional Patent Application No. 63/399,943, filed Aug. 22, 2022, the contents of which are incorporated herein by reference as if fully disclosed herein.

FIELD

This disclosure relates generally to optical phase shifters, and devices and methods of using these phase shifters. More particularly, this disclosure relates to asymmetric phase shifter arrangements that improve performance over a wide range of wavelengths.

BACKGROUND

Controllable optical phase shifters are often used in photonic integrated circuits to selectively modulate the phase of light carried by a waveguide. For example, thermo-optic phase shifters change the refractive index of a portion of a waveguide by changing its temperature, thereby inducing a phase shift in the light carried by the waveguide. Thermo-optic phase shifters typically have low optical loss, but are relatively slow in changing the refractive index and have relatively high power consumption. Other phase shifters may change the refractive index of a waveguide by changing the amount of charge carriers present in the waveguide. For example, in a PIN phase shifter, the waveguide is part of a PIN diode that changes the waveguide's refractive index via carrier injection in the waveguide during operation of the PIN diode. Conversely, in a PN phase shifter, the waveguide is part of a PN junction that changes the waveguide's refractive index via carrier depletion in the waveguide. These carrier-based phase shifters are relatively fast in changing the refractive index and have relatively low power consumption, but have a level of optical loss that typically increases with the magnitude of the refractive index change (and with it, the magnitude phase change generated).

Optomechanical phase shifters utilize a moveable structure, such as a membrane or suspended waveguide that is moveable to change an amount of evanescent coupling with a waveguide. Changing a position of the moveable structure changes the effective refractive index experienced by light traveling the waveguide, and thereby generates a phase change in that light. If an optomechanical phase shifter is used to modulate the phase of light across a range of wavelengths, however, the amount of phase shift provided by the optomechanical phase shifter may significantly vary as a function of wavelength. Accordingly, it is desirable to provide optomechanical phase shifters with improved performance across a broad range of wavelengths.

SUMMARY

Described herein are photonic integrated circuits, as well as optical devices such as controllable phase tuners and controllable optical switches for use in photonic integrated circuits, that include optomechanical phase shifters. Some embodiments are directed to a photonic integrated circuit that includes a substrate having a top surface, a waveguide supported on the top surface of the substrate, and an optomechanical phase shifter configured to change a phase of light traveling through a length of the waveguide. The optomechanical phase shifter includes a moveable structure and an actuator configured to move the moveable structure relative to the length of the waveguide between a first position and a second position. In some variations, the length of the waveguide has an asymmetric cross-sectional shape. Additionally or alternatively, the moveable structure has an asymmetric refractive index along a dimension of the moveable structure.

In some variations, the asymmetric cross-sectional shape of the length of the waveguide is asymmetric in a direction parallel to the top surface of the substrate. In some of these variations, the asymmetric cross-sectional shape of the length of the waveguide has a first section with a first height and a second section with a second height that is smaller than the first height. Additionally or alternatively, the moveable structure is moveable in between the first position and the second position in the direction parallel to the top surface of the substrate. In some instances, the asymmetric cross-sectional shape of the length of the waveguide is configured such that a distance between the moveable structure and a centroid of an amplitude profile of the light traveling through the length of the waveguide increases as a function of wavelength. Additionally or alternatively, the asymmetric cross-sectional shape of the length of the waveguide is asymmetric in a direction perpendicular to the top surface of the substrate.

In other variations, the waveguide includes a first symmetric region positioned on a first side of the length of the waveguide, and the first symmetric region of the waveguide has a symmetric cross-sectional shape. In some of these variations, the waveguide includes a first transition region positioned between the first symmetric region of the waveguide and the length of the waveguide, and the first transition region has a cross-sectional shape that changes between the symmetric cross-sectional shape of the symmetric region of the waveguide and the asymmetric cross-sectional shape of the length of the waveguide. Additionally or alternatively, the first symmetric region of the waveguide is configured as a strip waveguide. The waveguide may include a second symmetric region positioned on a second side of the length of the waveguide, and the second symmetric region of the waveguide has a symmetric cross-sectional shape and is configured as a symmetric rib waveguide. In some of these instances, the photonic integrated circuit also includes an additional phase shifter positioned to change the phase of light traveling through the second symmetric region. Additionally or alternatively, the first symmetric region of the waveguide is configured as a symmetric rib waveguide.

Other embodiments are directed to a photonic integrated circuit that includes a substrate, a waveguide supported on the substrate, a controllable phase tuner configured to adjust a phase of light traveling through a length of the waveguide by a target amount, and a controller. The controllable phase tuner includes a first phase shifter positioned to adjust the phase of light traveling through a first section of the length of the waveguide, and a second phase shifter positioned to adjust the phase of light traveling through a second section of the length of the waveguide. The controller controls the first phase shifter using a wavelength-independent control signal to adjust the phase of light traveling through the first section of the length of the waveguide by a first amount. The controller controls the second phase shifter using a wavelength-dependent control signal to adjust the phase of light traveling through the first section of the length of the waveguide by a second amount, such that the target amount is equal to a sum of the first amount and the second amount.

In some of these variations, the controller determines a target wavelength of light, and selects the wavelength-dependent control signal based on the target wavelength. Additionally or alternatively, the first section of the length of the waveguide has an asymmetric cross-sectional shape, and the second section of the length of the waveguide has a symmetric cross-sectional shape. In some of these variations, the second phase shifter is a carrier-based phase shifter.

Still other embodiments are directed to a photonic integrated circuit that includes a controllable switch. The controllable switch includes a first coupler having a first input, a first output, and a second output, a second coupler having a first input, a second input, a first output, and a second output, a first leg connecting a first output of the first coupler to a first input of the second coupler, and a second leg connecting a second output of the first coupler to the second input of the second coupler. The controllable switch also includes a first optomechanical phase shifter positioned and controllable to selectively provide a first amount of phase shift to light traveling through one of the first leg or the second leg, and a second optomechanical phase shifter positioned and controllable to selectively provide a second amount of phase shift to light traveling through one of the first leg or the second leg. The first optomechanical phase shifter and the second optomechanical phase shifter are controllable to selectively route light received by the first input of the first coupler between the first output and the second output of the second coupler.

In some variations, the first coupler is a 1×2 coupler, the first optomechanical phase shifter is positioned and controllable to provide the first amount of phase shift to light traveling through the first leg, and the second optomechanical phase shifter is positioned and controllable to provide the second amount of phase shift to light traveling through the first leg. In other variations, the first coupler is a 2×2 coupler and has a second input, the first optomechanical phase shifter is positioned and controllable to provide the first amount of phase shift to light traveling through the first leg, and the second optomechanical phase shifter is positioned and controllable to provide the second amount of phase shift to light traveling through the second leg. In some instances, the first amount of phase shift is equal to the second amount of phase shift, while in other instances the first amount is different than the second amount.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIGS. 9A-9D depict a variation of a controllable switch that utilizes multiple optomechanical phase shifters as described herein.

Figure 1A:
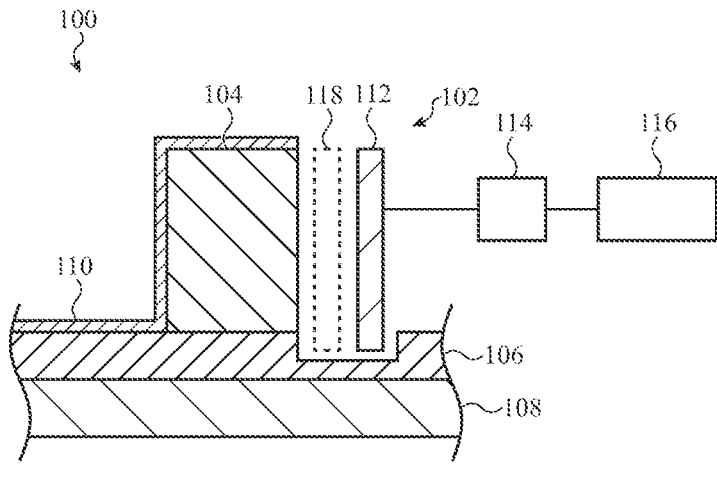
FIG. 1A shows a cross-sectional side view of a photonic integrated circuit that includes an optomechanical phase shifter.

It should be understood that the proportions and dimensions (either relative or absolute) of the various features and elements (and collections and subsettings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to photonic integrated circuits, as well as optical devices for use in photonic integrated circuits, that include an optomechanical phase shifter (referred to herein as an "OM phase shifter"). In some instances, the OM phase shifters described herein are configured with an asymmetry that improves the performance of the OM phase shifter by reducing the wavelength dependency of the phase shift generated by the OM phase shifter. Accordingly, these asymmetric OM phase shifters may generate a fast, power-efficient, and low-loss phase change across a wide range of wavelengths. The OM phase shifters described herein may also be used in an optical device to form a controllable optical switch, such that OM phase shifters may be actuated to selectively route light between different outputs of the controllable optical switch.

These and other embodiments are discussed with reference to FIGS. 1A-10. However, those skilled in the art will readily appreciate that the detailed description given herein with respect to these figures is for explanatory purposes only and should not be construed as limiting.

FIG. 1A shows a cross-sectional side view of a variation of a photonic integrated circuit 100 that includes an OM phase shifter 102 and a waveguide 104 that is supported on the top surface of a substrate 108. The OM phase shifter 102 is configured to change the phase of light travelling through a length of a waveguide 104. The waveguide 104 is positioned on a first cladding layer 106, which in turn is positioned on and supported by (either directly or via one or more intermediate layers) the top surface of substrate 108. In some instances, one or more additional surfaces of the waveguide 104 are covered with a second cladding layer 110, which may help provide optical confinement to light traveling through the waveguide 104. These layers may be formed from any suitable materials depending on the target wavelength or wavelengths of light that will be carried by the waveguide 104. For example, in some variations, the photonic integrated circuit 100 is configured to carry infrared light. In some of these variations, the waveguide 104 is formed from silicon, silicon nitride, silica, or the like, the first and second cladding layers 106, 110 are formed from dielectric materials such as silicon dioxide, and the substrate 108 is formed from silicon.

The OM phase shifter 102 includes a moveable structure 112, an actuator 114, and a controller 116. For the purpose of discussion herein, the OM phase shifter 102 is considered to include the portion of the waveguide 104 that experiences a phase change by virtue of operation of the OM phase shifter 102. The moveable structure 112 may be a membrane or waveguide structure that is moveable between a first position as shown in FIG. 1A and a second position 118, which is shown in phantom in FIG. 1A. The actuator 114 is configured, and controllable by the controller 116, to move the moveable structure 112 between the first position and the second position. For example, in some variations the actuator 114 may include a microelectromechanical system ("MEMS"). For example, the actuator 114 may be configured as an electrostatic MEMS actuator. OM phase shifters 102 with electrostatic MEMS actuators allow for fast switching with low optical loss.

In some variations, an electrostatic MEMS actuator is configured as a bistable electrostatic MEMS actuator. In these variations, the moveable structure 112 may be connected to or otherwise integrated into a MEMS actuator having a bistable structure. In these instances, the bistable structure has two equilibrium positions, the MEMS actuator may be controlled by the controller 116 to move between the two equilibrium positions. The bistable structure is configured such that when it is placed at an equilibrium position, it will remain in that position unless acted upon by an external force (i.e., no power is required to hold the bistable electrostatic MEMS actuator in an equilibrium position). Accordingly, power is only needed to move the bistable structure between its equilibrium positions, thereby reducing overall power consumption of the OM phase shifter 102 during operation. A first equilibrium position may position the moveable structure 112 at the first position as shown in FIG. 1A, while a second equilibrium position may position the moveable structure 112 at the second position 118.

Accordingly, in some instances the OM phase shifter 102 may be configured as a binary switch, where the OM phase shifter 102 is either turned "off" by placing the moveable structure 112 in the first position or turned "on" by placing the moveable structure 112 in the second position. Such an OM phase shifter 102 is capable of changing between on and off states quickly and with high accuracy. These binary switches allow for simplified control by a controller 116, as the controller 116 needs to be able to provide a control signal having two states, one that turns the OM phase shifter 102 off and the other that turns the OM phase shifter 102 on.

The amount of phase shift provided by the OM phase shifter 102 shown in FIG. 1A, when the moveable structure 112 is moved between off and on states, however, will have a wavelength dependency. Specifically, different wavelengths of light will have different levels of mode confinement within the waveguide 104, and as such the moveable structure 112 may interact differently with light of different wavelengths. Specifically, although the refractive index of the waveguide 104 itself does not change by virtue of movement of the moveable structure 112, movement of the moveable structure 112 does change the effective refractive index experienced by light traveling through the waveguide 104. This change in effective refractive index will, depending on the design of the photonic integrated circuit 100, vary as a function of wavelength of the light traveling through the waveguide 104.

Figure 1B:
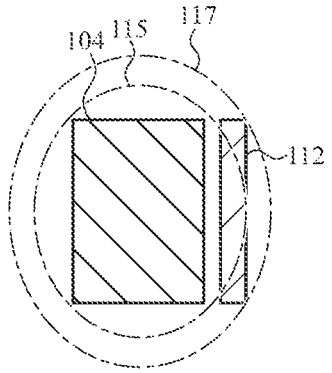
FIG. 1B shows a cross-sectional side view of components of the photonic integrated circuit of FIG. 1A.

To illustrate this, FIG. 1B shows the waveguide 104 and moveable structure 112 of the OM phase shifter 102 of the photonic integrated circuit 100 of FIG. 1A, with the moveable structure 112 placed in the second position discussed previously. Also shown there is a representation of an electric field amplitude profile (hereinafter an "amplitude profile") 115 of a first wavelength of light traveling through the waveguide 104 and the amplitude profile 117 of a second wavelength of light traveling through the waveguide 104. In this instance, the second wavelength is longer than the first wavelength. For the sake of illustration, the shape of amplitude profiles 115 and 117 depicted in FIG. 1B represents a boundary that encloses the portion (or portions) of the respective light's mode that has at least a threshold intensity level. For ease of illustration the amplitude profiles 115 and 117 are shown for light having a fundamental mode, and it should be appreciated that the discussion of wavelength dependency of the devices described herein assumes that the light of these different wavelengths has the same mode (or distribution of modes).

Because light of the first wavelength is better confined within the waveguide 104, less of the mode extends outside of the waveguide 104. Accordingly, when the moveable structure 112 is positioned as shown in FIG. 1B, a larger portion of the amplitude profile 117 of the longer second wavelength interacts with the moveable structure 112 as compared to the amplitude profile 115 of the first wavelength. In this way, the longer second wavelength experiences a greater change in effective refractive index when the OM phase shifter 102 is moved between off and on states.

Figure 1C:
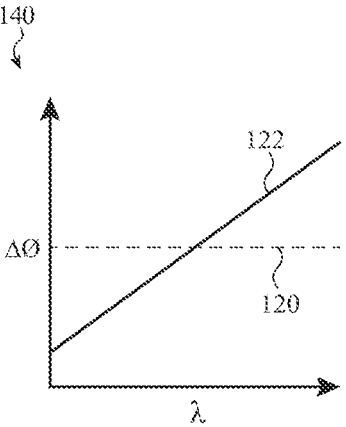
FIG. 1C shows a graph of phase change as a function of wavelength for the optomechanical phase shifter of FIG. 1A.

The amount of phase shift provided by an OM phase shifter is proportional to both the change in refractive index in the waveguide and the length of the waveguide that receives the change in refractive index, and is inversely proportional to the wavelength of light. FIG. 1C shows a graph 140 of the resulting phase change $\Delta\phi$ as a function of wavelength $\lambda$ when the OM phase shifter 102 is of FIG. 1A is moved between off and on states. If the change in refractive index $\Delta n$ is proportional to wavelength $\lambda$, then the phase change $\Delta\phi$ introduced by the OM phase shifter 102 will be wavelength independent (as indicated by line 120 in graph 140). When the waveguide 104 is configured as shown in FIG. 1A, the change in effective refractive index is not proportional to wavelength $\lambda$, which results in a phase change $\Delta\phi$ that depends on the wavelength $\lambda$ of light (as indicated by line 122 in graph 140). As the target range of wavelengths across which the OM phase shifter 102 is expected to operate increases, so does the magnitude of the impact of the wavelength dependency.

Accordingly, in some instances the OM phase shifters described herein are configured to reduce the wavelength dependency of the phase change provided by the OM phase shifter across a target wavelength range. For example, one or more components of the OM phase shifter may be designed with an asymmetry that adjusts the relationship between the change in effective refractive index and wavelength. In some variations, the OM phase shifter includes a segment of a waveguide having an asymmetric cross-sectional shape.

Figure 2A:
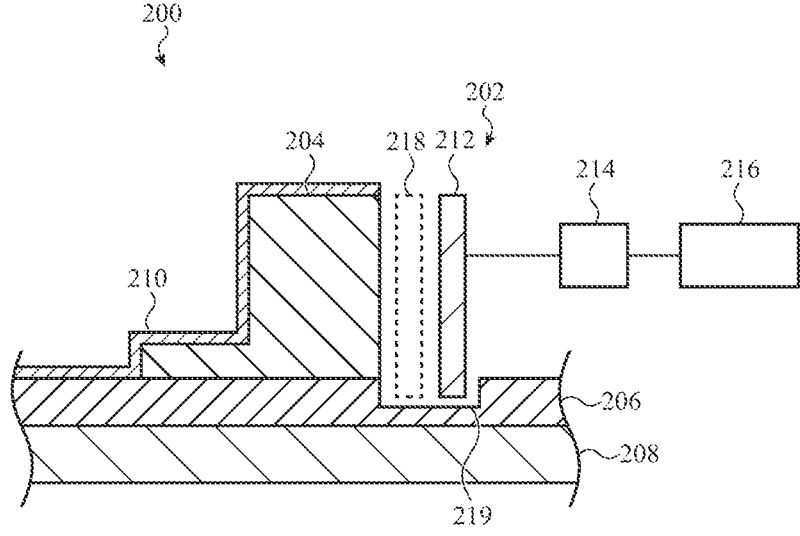
FIGS. 2A and 2B show cross-sectional side views of variations of photonic integrated circuits that include asymmetric optomechanical phase shifters as described herein.

FIG. 2A shows an example of a photonic integrated circuit 200 having an OM phase shifter 202 that includes a length of a waveguide 204 that has an asymmetric cross-sectional shape. When the term "cross-sectional shape" is used to discuss a portion of a waveguide, this term refers to the shape of the waveguide along a plane that intersects the waveguide at an angle that is perpendicular to the direction that light travels through the waveguide. As shown there, the waveguide 204 is positioned on a first cladding layer 206, which in turn is supported on (either directly or via one or more intermediate layers) the top surface of a substrate 208, such as described above with respect to FIG. 1A. In some instances, one or more additional surfaces of the waveguide 204 are covered with a second cladding layer 210, which may help provide optical confinement to the waveguide 204. For example, in the variation shown in FIG. 2A, the first and second cladding layers 206, 210 cover every side of the waveguide 204 except for a lateral side facing a moveable structure 212 of the OM phase shifter 202. The exposed side surface of the waveguide 204 facing the moveable structure 212 allows the moveable structure 212 to be moved closer to waveguide 204 during operation of the OM phase shifter 202.

The OM phase shifter 202 further includes a moveable structure 212, an actuator 214, and a controller 216. The actuator 214 is controllable by the controller 216 to move the moveable structure 212 between a first position as shown in FIG. 2A and a second position 218 shown in phantom in FIG. 2A. The moveable structure 212 and actuator 214 may be configured in any suitable manner as described above with respect to the OM phase shifter 202 of FIG. 2A. For example, in some variations the actuator 214 may include a bistable electrostatic MEMS actuator as discussed above.

In the variation shown in FIG. 2A, the OM phase shifter 202 is configured such that the moveable structure 212 is positioned next to a lateral side of the waveguide 204, and the actuator 214 moves the moveable structure 212 in a direction parallel to the top surface of the substrate 208. In this way, actuation of the moveable structure 212 moves the moveable structure 212 closer or farther from the later side of the waveguide 204. In some of these instances, the first cladding layer 206 (and optionally the substrate 208) defines a cavity 219 extending at least partially therethrough. This may provide additional clearance to facilitate movement of the moveable structure 212.

Figure 2B:
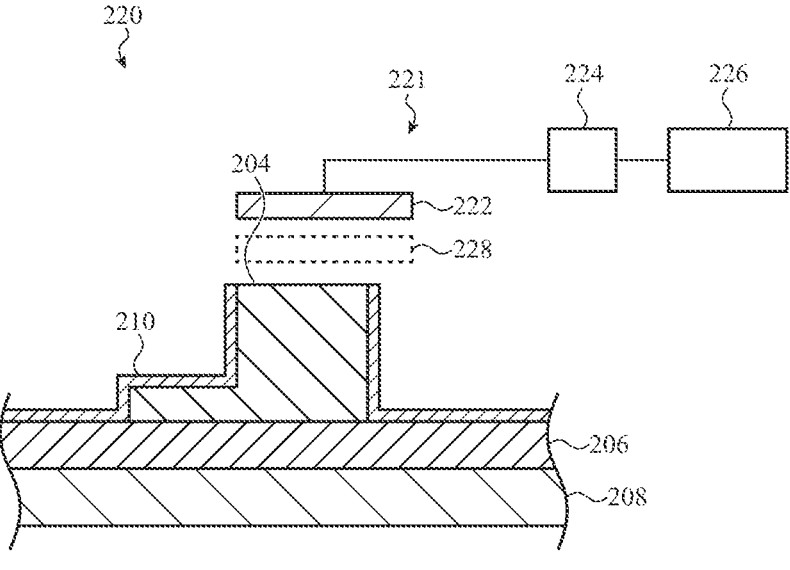

In other variations, the moveable structure may be moved in a direction perpendicular to the top surface of the substrate 208. For example, FIG. 2B shows another variation of a photonic integrated circuit 220. The photonic integrated circuit 220 includes a waveguide 204, a first cladding layer 206, and a substrate 208 which are configured as described above with respect to FIG. 2B. The photonic integrated circuit 220 includes an OM phase shifter 221 including a moveable structure 222, an actuator 224, and a controller 226. These components are similar to the moveable structure 212, actuator 214, and controller 216 of FIG. 2A, except that the moveable structure 222 is positioned above a top surface of the waveguide 204 and is moveable vertically relative to the top surface of the waveguide 204. Specifically, the actuator 224 is controlled by the controller 226 to move the moveable structure 222 in a direction perpendicular to the top surface of the substrate 208 between a first position, as shown in FIG. 2B, and a second position 228, shown in phantom in FIG. 2B.

As mentioned above, a segment of the waveguide 204 in the embodiments of the photonic integrated circuits 200 and 220 in FIGS. 2A and 2B has an asymmetric cross-sectional shape. When the waveguide has a symmetric cross-sectional shape along a given direction (e.g., a direction parallel to the top surface of the substrate 208 or a direction perpendicular to the top surface of the substrate 208), such as the waveguide 104 in FIG. 1A, the mode of light traveling through the waveguide has an amplitude profile with a centroid (i.e., the centroid of intensity values across the amplitude profile) that is centered in the waveguide along that direction. For example, when the waveguide is a strip waveguide (which is symmetric in two perpendicular directions), the amplitude profile of the mode will have a centroid positioned at a center of the strip waveguide. This centroid remains positioned at the center of the strip waveguide regardless of wavelength.

Figure 2C:
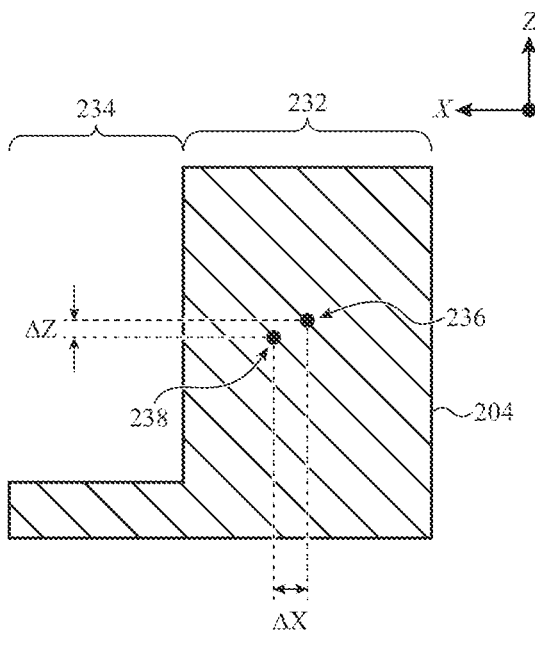
FIG. 2C shows a cross-sectional side view of the waveguide of the photonic integrated circuits of FIGS. 2A and 2B.

Conversely, the positioning of the centroid of the amplitude profile will vary as a function of wavelength for waveguides that have an asymmetric cross-sectional shape. For example, FIG. 2C shows the waveguide 204 of the photonic integrated circuits 200 and 220 in FIGS. 2A and 2B. As shown there, the waveguide 204 has a first section 232 with a first height and a second section 234 with a second height smaller than the first height, such that the waveguide 204 is asymmetric in a direction that is parallel to the top surface of the substrate 208 (labeled and referred to herein as the X-direction of a cartesian coordinate system). In these instances, the positioning of the centroid of the amplitude profile along the X-direction will vary as a function of wavelength. Light of shorter wavelengths will be more easily confined in the first section 232, and thus will have amplitude profiles with centroids closer to the center of the first section 232. For example, FIG. 2C shows a centroid 236 of the amplitude profile of a first wavelength of light and a centroid 238 of the amplitude profile of a second wavelength of light, where the second wavelength that is longer than the first wavelength. The centroid 236 of the first wavelength is separated by the centroid 238 of the second wavelength along the X-direction by a first separation distance ΔX.

When a moveable structure is positioned next to the first section 232 of the waveguide 204 (i.e., such that the first section 232 is positioned between the second section 234 and the moveable structure 212 of the OM phase shifter 202 of FIG. 2A), the asymmetry of the cross-sectional shape of the waveguide 204 in the X-direction results in the amplitude profile centroids of shorter wavelengths (e.g., centroid 236) being positioned closer to the moveable structure than the amplitude profile centroids of longer wavelengths (e.g., centroid 238). Accordingly, the waveguide 204 is shaped such that the distance between the moveable structure and the centroid of the amplitude profile of light increases as a function of wavelength (e.g., is proportional to the wavelength). By shifting the centroid of the amplitude profile further away for longer wavelengths, this reduces the difference in changes to effective refractive index experienced by different wavelengths as compared to the instance of the symmetric waveguide discussed above with respect to FIG. 1B.

Figure 2D:
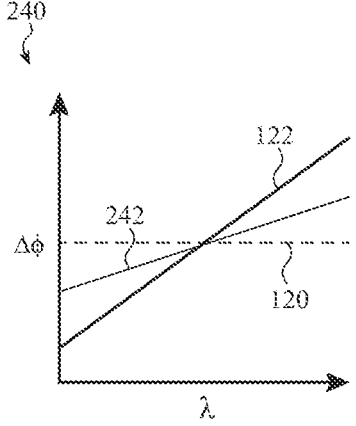
FIG. 2D is a graph of phase change as a function of wavelength for the optomechanical phase shifters of FIGS. 2A and 2B.

By adjusting the wavelength dependency of the change in effective refractive index, an OM phase shifter with an asymmetrically-shaped waveguide may be designed to provide a phase change with less wavelength dependency as compared to OM phase shifters that include a symmetrically-shaped waveguide. The dimensions and shape of the asymmetrically-shaped waveguide may be tailored to better approximate the proportional relationship between wavelength and effective refractive index change that is desired to provide wavelength independence of the OM phase shifter over a target range of wavelengths. For example, FIG. 2D shows a graph 240 of phase change as a function of wavelength for the optomechanical phase shifters of FIGS. 2A and 2B, and includes lines 120 and 122 from the graph 140 of FIG. 1C, representing, respectively, a wavelength-independent phase change and the wavelength-dependent phase change of the OM phase shifter 102 of FIG. 1A. Also shown there is an example line 242, which represents an example phase change of the OM phase shifters 202 and 221 of FIGS. 2A and 2B as a function of wavelength. In this example, the OM phase shifters 202 and 221 have less wavelength dependence than the OM phase shifter 102 of FIG. 1A.

In addition to being asymmetric along a direction parallel to the surface of the substrate (i.e., the X-direction), the cross-sectional shape of the waveguide 204 may be asymmetric along a direction perpendicular to the surface of the substrate (labeled and referred to herein as the Z-direction of a cartesian coordinate system). In these instances, the positioning of the centroid of the amplitude profile along the Z-direction will vary as a function of wavelength. Light of shorter wavelengths will be more easily confined in the first section 232, and thus will have amplitude profiles with centroids (e.g., centroid 236) closer to the center of the first section 232. Longer wavelengths will couple more into the second section 234, and thus will have amplitude profiles with centroids (e.g., centroid 238) closer to the substrate 208. As shown in FIG. 2C, the centroid 236 of the first wavelength is separated by the centroid 238 of the second wavelength along the Z-direction by a first separation distance ΔZ.

When a moveable structure is positioned above the waveguide 204 (i.e., such that the waveguide 204 is positioned between the substrate 208 and the moveable structure 222 of the OM phase shifter 221 of FIG. 2B), the asymmetry of the cross-sectional shape of the waveguide 204 in the Z-direction results in the amplitude profile centroids of shorter wavelengths (e.g., centroid 236) being positioned closer to the moveable structure along the Z-direction as compared to the amplitude profile centroids of longer wavelengths (e.g., centroid 238). This may reduce the wavelength-dependence of the phase change that occurs as the moveable structure 222 moves along the Z-direction. Additionally, depending on the size and positioning of the moveable structure, an asymmetry along the X-direction may also impact the wavelength dependency of a moveable structure that moves along the Z-direction (e.g., the moveable structure 222). Similarly, an asymmetry along the Z-direction may impact the wavelength dependent of a moveable structure that moves along the X-direction (e.g., the moveable structure 212).

Figure 3A:
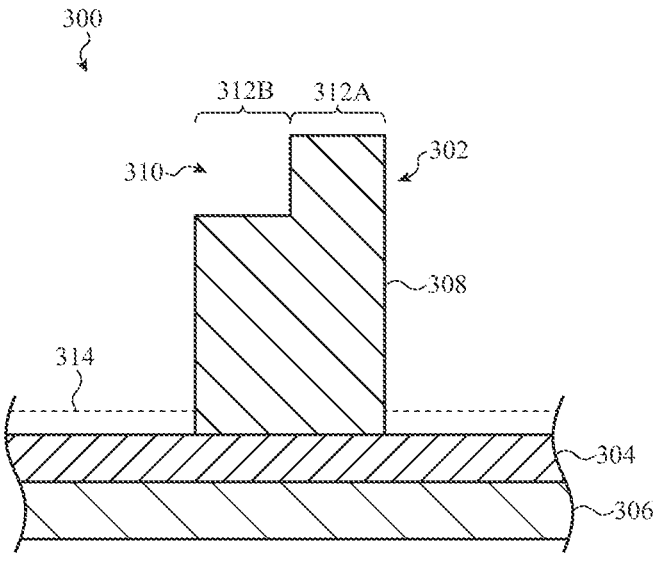
FIGS. 3A-3D show cross-sectional side views of photonic integrated circuits having waveguides with different asymmetric cross-sectional shapes suitable for use with the asymmetric optomechanical phase shifters described herein.

FIGS. 3A-3D show examples of variations of waveguides having asymmetric cross-sectional shapes that may be used with the OM phase shifters described herein. For example, FIG. 3A shows a variation of a photonic integrated circuit 300 including a waveguide 302 having an asymmetric cross-sectional shape. A bottom side of the waveguide 302 is positioned on a first cladding layer 304, which in turn is supported on (either directly or via one or more intermediate layers) the top surface of a substrate 306. In this variation, the waveguide 302 is configured as a strip 308 that is shaped to define a cavity 310 that extends to one lateral side of the strip 308. The presence of the cavity 310 divides the strip 308 into a first section 312A with a first height and a second section 312B with a second height smaller than the first height. This provides asymmetry both along a direction parallel to the top surface of the substrate 306 and along a direction perpendicular to the top surface of the substrate 306. In some instances, the cavity 310 may be formed by etching along a length of a symmetric strip waveguide. In other variations, the waveguide 302 may further include a slab waveguide 314 (shown in phantom in FIG. 3A), in which case the strip 308 acts as the strip portion of a rib waveguide.

Figure 3B:
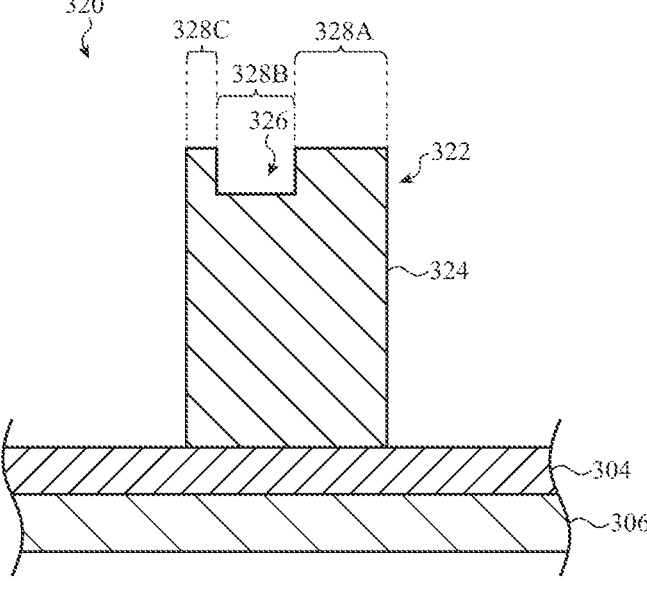

FIG. 3B shows another variation a photonic integrated circuit 320 including a waveguide 322 having an asymmetric cross-sectional shape. A bottom side of the waveguide 332 is positioned on a first cladding layer 304 that is supported by the top surface of a substrate 306 such as described previously. In this variation, the waveguide 322 is configured as a strip 324 that is shaped to define a cavity 326 that does not extend to either lateral side of the strip 324. The presence of the cavity 326 divides the strip 324 into a first section 328A with a first height, a second section 328B with a second height smaller than the first height, and a third section 328C with a third height. In some instances the third height may be the same as the first height, such that the first section 328A and the third section 328C have the same height. In other instances, one of these sections may be etched such that the first and third heights are different. The presence of the cavity 326, which may be formed by etching along a length of a symmetric strip waveguide, provides asymmetry along a direction perpendicular to the top surface of the substrate 306. Assuming the cavity 326 is not centered in the strip 324 (and/or the first and third sections 328A, 328C have different heights), the waveguide also has asymmetry along a direction parallel to the top surface of the substrate 306. It should be appreciated that the waveguide 302 may include a slab waveguide (not shown) to form a rib waveguide as discussed above with respect to FIG. 3A.

Figure 3C:
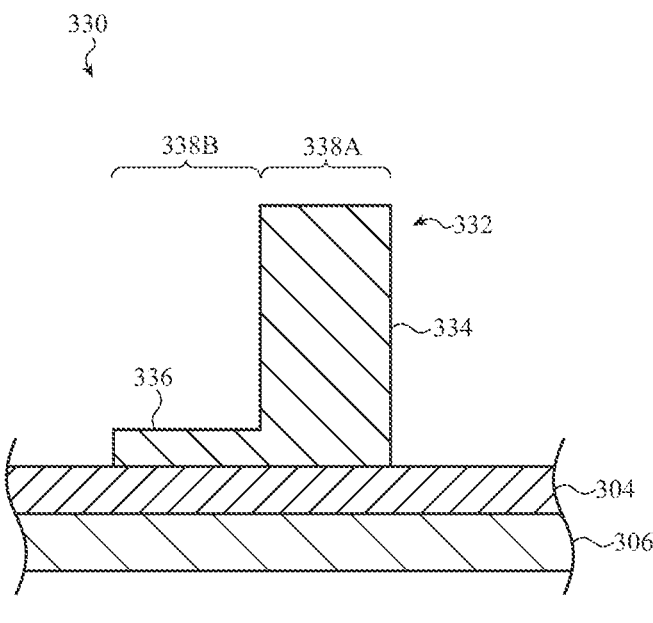

FIG. 3C shows yet another variation a photonic integrated circuit 330 including a waveguide 332 having an asymmetric cross-sectional shape. A bottom side of the waveguide 332 is positioned on a first cladding layer 304 that is supported by the top surface of a substrate 306. In these variations, the waveguide 332 is configured as an asymmetric rib waveguide having a strip 334 positioned on a slab waveguide 336. In these instances, the slab waveguide 336 is positioned such that it extends past one lateral side of the strip 334 to define a shoulder on that side of the strip 334, but does not extend past the opposite lateral side of the strip 334. Accordingly, the strip 334 defines a first section 338A of the waveguide 332 with a first height and the slab waveguide 336 defines a second section 338B of the waveguide 332 with a second height smaller than the first height. Accordingly, the waveguide 332 has a cross-sectional shape that is asymmetric both along a direction parallel to the top surface of the substrate 306 and along a direction perpendicular to the top surface of the substrate 306.

Figure 3D:
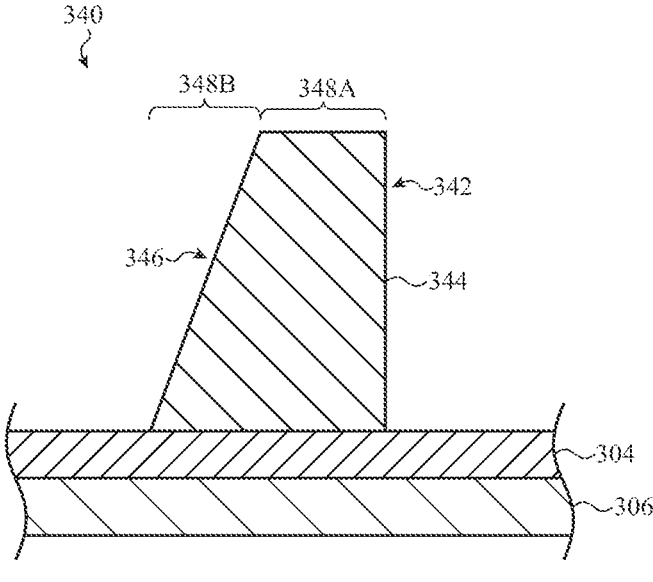

FIG. 3D shows still another variation of a photonic integrated circuit 340 including a waveguide 342 having an asymmetric cross-sectional shape. A bottom side of the waveguide 342 is positioned on a first cladding layer 304 that is supported by the top surface of a substrate 306. In these variations, the waveguide 342 is configured as a strip 344 having an angled lateral surface 346. The angled lateral surface 346 is angled at a non-zero angle that is not perpendicular to the top surface of the substrate 306. Accordingly, the waveguide 342 includes a first section 348A having a first height and a second section 348B that has a varying height. This varying height may include a range of heights that are each smaller than the first height. In the variation shown in FIG. 3D, the second section 348B has a height that varies from the first height to a height of zero (i.e., where the waveguide 342 meets the first cladding layer 304). In other instances, the second section 348B has a height that varies from the first height to a second, non-zero height. The angled lateral surface 346 may be formed from etching a portion of the waveguide 342 (e.g., using anisotropic etching or the like). The waveguide 342 has a cross-sectional shape that is asymmetric both along a direction parallel to the top surface of the substrate 306 and along a direction perpendicular to the top surface of the substrate 306.

It should be appreciated that FIGS. 3A-3D are just a number of illustrative examples of how a waveguide may have an asymmetric cross-sectional shape, and it should be appreciated that other waveguide designs (including those that use combinations of aspects of the waveguides shown in FIGS. 3A-3D) may be asymmetric along a direction parallel to a top surface of a substrate and/or perpendicular to a top surface of the substrate as described above. Additionally, while not shown in FIGS. 3A-3D, any of these waveguides may include a second cladding layer that covers one or more sides of the waveguide as described above with respect to the OM phase shifters 202 and 221 of FIGS. 2A and 2B, and in some instances includes an exposed surface (i.e., not covered by the second cladding layer) that faces the moving structure of the OM phase shifter.

Figure 4:
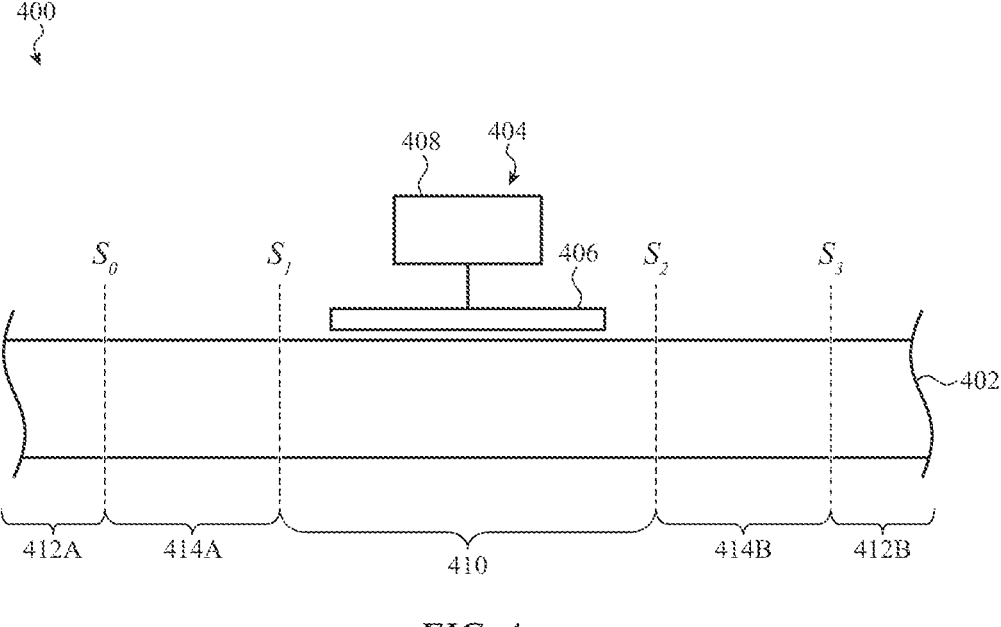
FIG. 4 shows a top view of a variation of photonic integrated circuits as described herein that includes an asymmetric optomechanical phase shifter with a transition region.

While an OM phase shifter as described herein may utilize a portion of a waveguide having an asymmetric cross-sectional shape, it may be desirable for other portions of the waveguide to have a symmetric cross-sectional shape. For example, FIG. 4 shows a top view of a photonic integrated circuit 400 including a waveguide 402 and an OM phase shifter 404. The OM phase shifter 404 includes a moveable structure 406 and an actuator 408 configured to move the moveable structure 406 relative to the waveguide 402. The OM phase shifter 404 also includes an asymmetric region 410 of the waveguide 402 (defined as a length of the waveguide 402 between lines $S_1$ and $S_2$) that has an asymmetric cross-sectional shape as discussed previously. Additionally, the waveguide includes a first symmetric region 412A positioned on a first side of the asymmetric region 410 (shown to the left of line $S_0$) and a second symmetric region 412B positioned on a second side of the asymmetric region 410 (shown to the right of line $S_3$), where the first and second symmetric regions 412A, 412B have symmetric cross-sectional shapes. The various regions of the waveguide are optically connected such that light may travel from the first symmetric region 412A to the asymmetric region 410 and then to second symmetric region 412B (or vice versa).

The waveguide 402 includes a first transition between the first symmetric region 412A and the asymmetric region 410, and a second transition between the asymmetric region 410 and the second symmetric region 412B. In some instances, the first transition and/or the second transition is an abrupt transition where the shape of the waveguide 402 changes between the symmetric shape and the asymmetric shape at a single point (e.g., at line $S_1$ and/or line $S_2$). In other instances, the first transition and/or the second transition includes a transition region in which the cross-sectional shape of the waveguide 402 changes along a length of the transition region. For example, in the variation shown in FIG. 4, the waveguide 402 includes a first transition region 414A between the first symmetric region 412A and the asymmetric region 410 (i.e., between lines $S_0$ and $S_1$). At the start of the first transition region 414A at line $S_0$, the waveguide 402 has a symmetric cross-sectional shape. Within the first transition region 414A between lines $S_0$ and $S_1$, the waveguide has an asymmetric cross-sectional shape that changes until it reaches the asymmetric cross-sectional shape of the asymmetric region 410 at line $S_1$. Similarly, the waveguide 402 includes a second transition region 414B between the asymmetric region 410 and the second symmetric region 412B (i.e., between lines $S_2$ and $S_3$). In the second transition region 414B, the cross-sectional waveguide changes from the asymmetric cross-sectional shape of the asymmetric region 410 at line $S_2$ to the symmetric cross-sectional shape of second symmetric region 414B at line $S_3$. These transition regions can reduce losses that would be associated with abrupt changes in the waveguide shape.

Figure 5A:
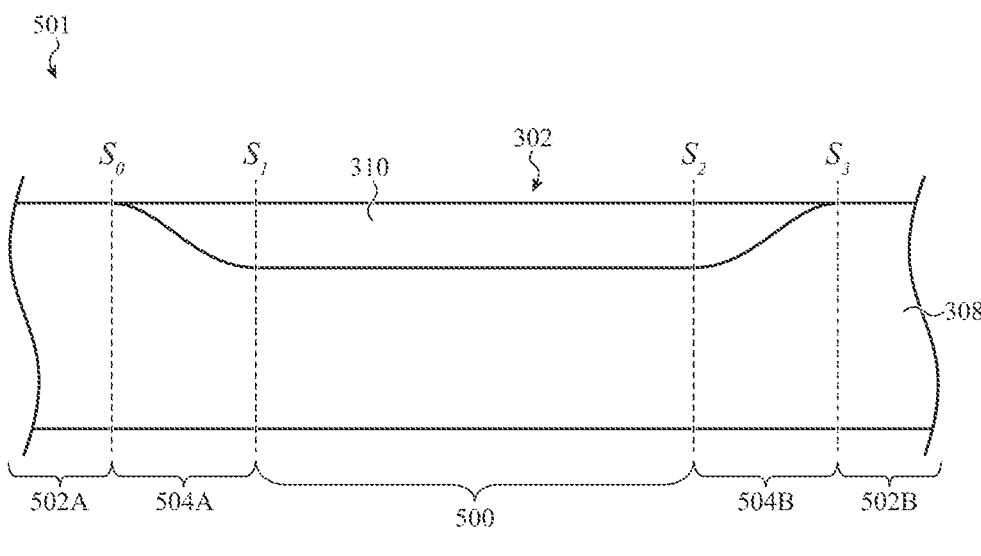
FIGS. 5A-5D show top views of waveguides having transition regions that are suitable for use with the asymmetric optomechanical phase shifters described herein.

FIGS. 5A-5D show top views of examples of waveguides that have transition regions with cross-sectional shapes that vary between a corresponding symmetric region and an asymmetric region thereof. For example, FIG. 5A shows an example of a photonic integrated circuit 501 that includes the waveguide 302 of FIG. 3A and utilizes transition regions as described above. For example, the waveguide 302 includes an asymmetric region 500 (between lines $S_1$ and $S_2$)

that has a cross-sectional shape as shown in FIG. 3A (i.e., configured as a strip 308 with a cavity 310 defined therein). The waveguide 302 includes a first symmetric region 502A on a first side of the asymmetric region 500 (i.e., to the left of line $S_0$) and a second symmetric region 502B on a second side of the asymmetric region 500 (i.e., to the right of line $S_3$). In the first and second symmetric regions 502A, 502B, the cavity 310 is not present and the waveguide 302 is configured as a strip waveguide with a rectangular cross-sectional shape (such as the strip waveguide 552 depicted in FIG. 5F).

The waveguide 302 includes a first transition region 504A between the first symmetric region 502A and the asymmetric region 500 (i.e., between lines $S_0$ and $S_1$), and a second transition region 504B between the asymmetric region 500 and the second symmetric region 502B (i.e., between lines $S_2$ and $S_3$). In these variations, first transition region 504A includes the cavity 310 (and thus has an asymmetric cross-sectional shape), but the width of the cavity increases between the first symmetric region 502A to the asymmetric region 500. Similarly, the second transition region 504B includes the cavity 310 (and thus has an asymmetric cross-sectional shape), but the width of the cavity decreases between the asymmetric region 500 to the second symmetric region 502B. The width of the cavity 310 may remain constant within the asymmetric region 500 (and thus the cross-sectional shape of the waveguide 302 does not change in the asymmetric region 500). In other instances, the width of the cavity 310 (and thereby the cross-sectional shape of the waveguide 302) may change within the asymmetric region 500.

Figure 5B:
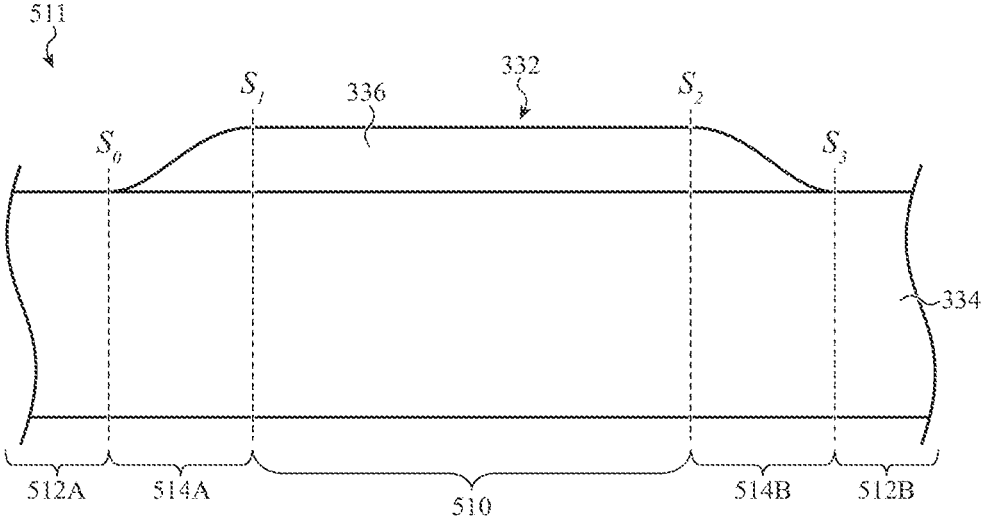

FIG. 5B shows an example of a photonic integrated circuit 511 that includes the waveguide 332 of FIG. 3C and utilizes transition regions. For example, as shown in FIG. 5B, the waveguide 332 includes an asymmetric region 510 (between lines $S_1$ and $S_2$) that has a cross-sectional shape as shown in FIG. 3C (i.e., configured as an asymmetric rib waveguide having a strip 334 positioned on a slab waveguide 336). The waveguide 332 includes a first symmetric region 512A on a first side of the asymmetric region 510 (i.e., to the left of line $S_0$) and a second symmetric region 512B on a second side of the asymmetric region 510 (i.e., to the right of line $S_3$). In the first and second symmetric regions 512A, 512B, the slab waveguide 336 does not extend past either lateral side of the strip 334 and the waveguide 332 is configured as a strip waveguide with a rectangular cross-sectional shape (such as the strip waveguide 552 depicted in FIG. 5F).

The waveguide 332 includes a first transition region 514A between the first symmetric region 512A and the asymmetric region 510 (i.e., between lines $S_0$ and $S_1$), and a second transition region 514B between the asymmetric region 510 and the second symmetric region 512B (i.e., between lines $S_2$ and $S_3$). In the first transition region 514A, the slab waveguide 336 extends laterally past a side of the strip 334 at a width that increases from the first symmetric region 512A to the asymmetric region 510. Similarly, the width of the slab waveguide 336 that extends laterally past the lateral side of the strip 334 decreases in the second transition region 514B from the asymmetric region 510 to the second symmetric region 512B. The width of the slab waveguide 336 that extends laterally may remain constant within the asymmetric region 510 (and thus the cross-sectional shape of the waveguide 332 does not change in the asymmetric region 510). In other instances, the width of the laterally extending portion of the slab waveguide 336 (and thereby the cross-sectional shape of the waveguide 332) may change within the asymmetric region 510.

Figure 5C:
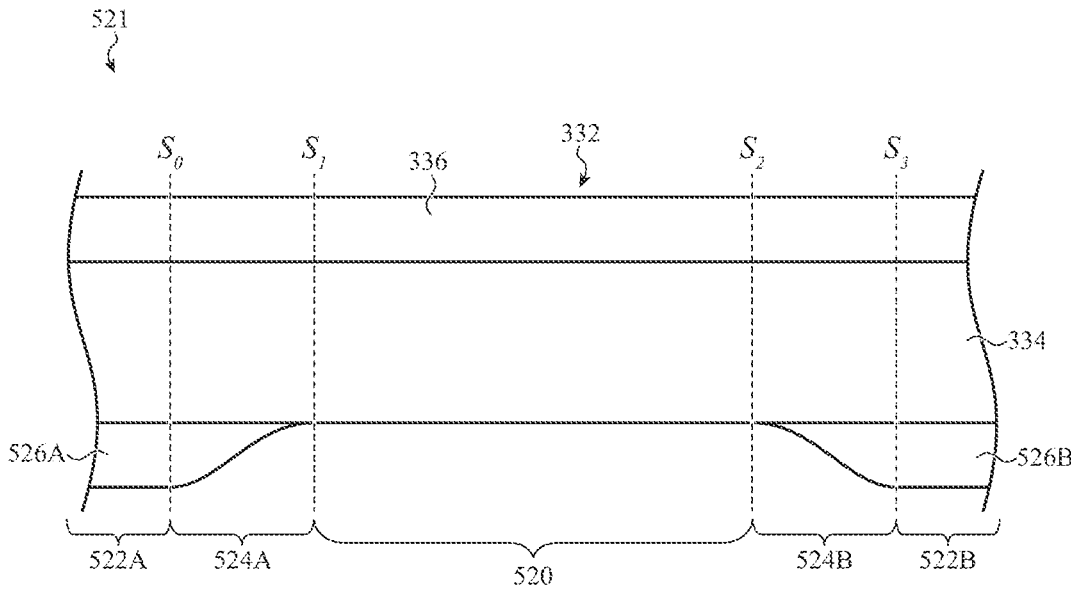

FIG. 5C shows an example of a photonic integrated circuit 521 that includes the waveguide 332 of FIG. 3C and utilizes transition regions. In the example shown in FIG. 5C, the waveguide 332 includes an asymmetric region 520 (between lines $S_1$ and $S_2$) that has a cross-sectional shape as shown in FIG. 3C (i.e., as an asymmetric rib waveguide having a strip 334 positioned on a slab waveguide 336). The waveguide 332 includes a first symmetric region 522A on a first side of the asymmetric region 520 (i.e., to the left of line $S_0$) and a second symmetric region 522B on a second side of the asymmetric region 520 (i.e., to the right of line $S_3$). In the first and second symmetric regions 522A, 522B, the slab waveguide 336 extends past both lateral sides of the strip 334 and the waveguide 332 is configured as a symmetric rib waveguide (such as the symmetric rib waveguide 542 depicted in FIG. 5E). The waveguide 332 includes a first transition region 524A between the first symmetric region 522A and the asymmetric region 520 (i.e., between lines $S_0$ and $S_1$), and a second transition region 524B between the asymmetric region 520 and the second symmetric region 522B (i.e., between lines $S_2$ and $S_3$).

In the first transition region 524A, a width of a first portion 526A of the slab waveguide 336 that extends laterally past a side of the strip 334 decreases from the first symmetric region 522A to the asymmetric region 520 (e.g., decreases to a width of zero). Similarly, the width of a second portion 526B of the slab waveguide 336 that extends laterally past the side of the strip 334 increases in the second transition region 524B from the asymmetric region 520 to the second symmetric region 522B (e.g., increases from a width of zero). The width of the slab waveguide 336 that extends laterally may remain constant within the asymmetric region 520 (and thus the cross-sectional shape of the waveguide 332 does not change in the asymmetric region 520). In other instances, the width of the laterally extending portion of the slab waveguide 336 (and thereby the cross-sectional shape of the waveguide 332) may change within the asymmetric region 520.

Figure 5D:
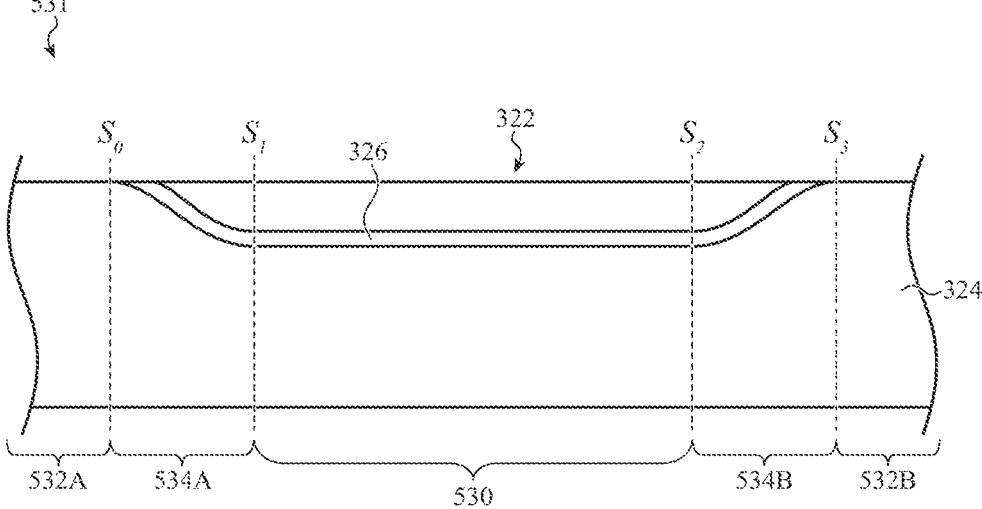
Figure 5E:
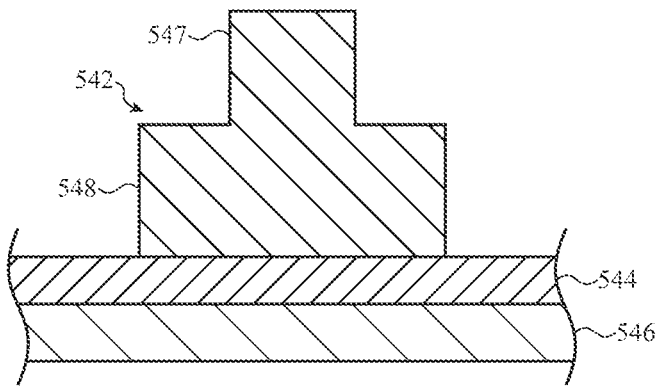
FIG. 5E shows a cross-sectional side view of a photonic integrated circuit having a rib waveguide.

In some instances, the waveguide 332 is instead configured such that the symmetric region on one side of an asymmetric region is configured as a strip waveguide (such as the strip waveguide 552 depicted in FIG. 5F) and the symmetric region on a second side of the asymmetric region is configured as a symmetric rib waveguide (such as the symmetric rib waveguide 542 depicted in FIG. 5E). For example, the example of waveguide 332 of the photonic integrated circuit 521 may in some instances be configured with the first symmetric region 522A, the first transition region 524A, and the asymmetric region 510 as shown in FIG. 5C, but instead includes the second transition region 514B and the second symmetric region 512B as shown in FIG. 5B. In this way, the waveguide may transition from a symmetric rib waveguide to an asymmetric rib waveguide, and then transition from the asymmetric rib waveguide to a strip waveguide. In this way, an OM phase shifter may also act as a rib-to-strip converter (or vice versa).

FIG. 5D shows an example of a photonic integrated circuit 531 that includes the waveguide 322 of FIG. 3B and utilizes transition regions. For example, the waveguide 322 includes an asymmetric region 530 (between lines $S_1$ and $S_2$) that has a cross-sectional shape as shown in FIG. 3A (i.e., configured as a strip 324 with a cavity 326 defined therein that does not extend to a lateral side of the strip 324). The waveguide 322 includes a first symmetric region 532A on a first side of the asymmetric region 530 (i.e., to the left of line $S_0$) and a second symmetric region 532B on a second side of the asymmetric region 530 (i.e., to the right of line $S_3$). In the first and second symmetric regions 532A, 532B, the cavity 326 is not present and the waveguide 302 is configured as a strip waveguide 324 with a rectangular cross-sectional shape (such as the strip waveguide 552 depicted in FIG. 5F). The waveguide 322 includes a first transition region 534A between the first symmetric region 532A and the asymmetric region 530 (i.e., between lines $S_0$ and $S_1$), and a second transition region 534B between the asymmetric region 530 and the second symmetric region 532B (i.e., between lines $S_2$ and $S_3$).

In these variations, first transition region 534A includes the cavity 326 (and thus has an asymmetric cross-sectional shape), but the cavity 326 starts at a lateral side of the strip 324 and moves inward from the first symmetric region 532A to the asymmetric region 530. Similarly, the second transition region 534B includes the cavity 326 (and thus has an asymmetric cross-sectional shape), but the cavity moves outward toward the lateral side of the strip 324 from the asymmetric region 530 to the second symmetric region 532B. The width of the cavity 326 may remain constant within the asymmetric region 530 (and thus the cross-sectional shape of the waveguide 322 does not change in the asymmetric region 500). In other instances, the width of the cavity 326 (and thereby the cross-sectional shape of the waveguide 322) may change within the asymmetric region 530.

Figure 5F:
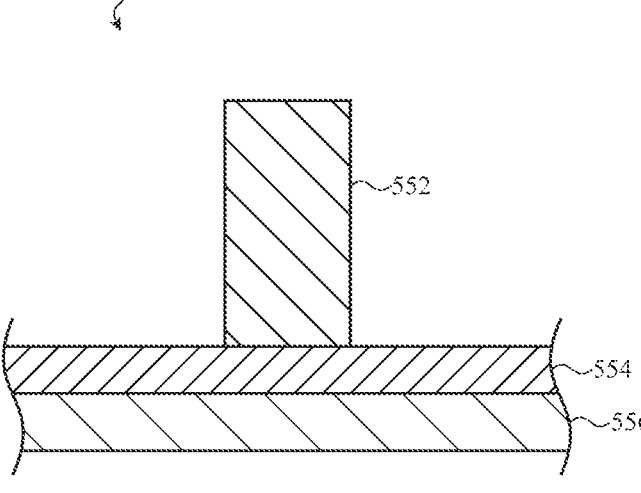
FIG. 5F shows a cross-sectional side view of a photonic integrated circuit having a strip waveguide.

FIG. 5E shows a variation of a photonic integrated circuit 540 having a symmetric rib waveguide 542 positioned on a cladding layer 544 and supported by a substrate 546, such as described in more detail above. Specifically, the symmetric rib waveguide 542 includes a strip 547 centered on a slab waveguide 548, which in turn is positioned on the cladding layer 544. The cross-sectional shape of the symmetric rib waveguide 542 is symmetric along a direction parallel to a top surface of the substrate 546. FIG. 5F shows a variation of a photonic integrated circuit 550 having a strip waveguide 552 with a rectangular cross-sectional shape. The strip waveguide 552 is positioned on a cladding layer 554 and supported by a substrate 556, such as described in more detail above. The cross-sectional shape of the strip waveguide 552 is symmetric both along a direction parallel to a top surface of the substrate 556 and along a direction perpendicular to the top surface of the substrate.

Figure 6:
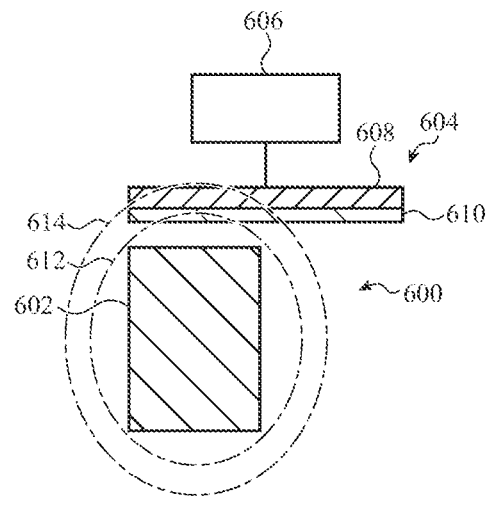
FIG. 6 shows a cross-sectional side view of a portion of an asymmetric optomechanical phase shifter having a movable structure with an asymmetric refractive index.

In some variations of the OM phase shifters described here, the moveable structure may be configured to have an asymmetric refractive index, which may be tailored to help reduce the wavelength dependency of phase shift provided by the OM phase shifter. For example, FIG. 6 shows a variation of an OM phase shifter 600 including a waveguide 602, a moveable structure 604, and an actuator 606. The actuator 606 may be controlled by a controller (not shown) to change a position of the moveable structure 604, such as described previously. While the waveguide 602 is shown in FIG. 6 as having a symmetric cross-sectional shape, it should be appreciated that the OM phase shifter 600 of FIG. 6 may instead include a segment of a waveguide having an asymmetric cross-sectional shape as described previously.

The moveable structure 604 is configured to have a spatially-varying refractive index within the moveable structure 604. In some variations, the moveable structure 604 includes multiple layers having different refractive indices. For example, in the variations shown in FIG. 6, the moveable structure 604 includes a first layer 610 of a first material (e.g., silicon) and a second layer 608 of a second material (e.g., silicon nitride) having a lower refractive index than the first material. Additionally or alternatively, the moveable structure 604 may have one or more layers that have a refractive index gradient where the refractive index changes from a first side of the layer to a second side of the layer opposite the first side. The moveable structure 604 may be configured such that the refractive index of the moveable structure 604 changes in a direction parallel to the direction that the actuator moves the moveable structure 604 (e.g., in a direction parallel to a top surface of a substrate for OM phase shifters configured as shown in FIG. 2A or in a direction perpendicular to the top surface of the substrate for OM phase shifters configured as shown in FIG. 2B). If the refractive index of the moveable structure 604 increases in a direction toward the waveguide, this may reduce the difference in changes to effective refractive index experienced by different wavelengths as compared to the instance of a moveable structure having a constant refractive index. For example, a first portion of the moveable structure 604 closer to the waveguide 602 has a higher refractive index and that is higher than that of a second portion of the moveable structure 604 positioned farther from the waveguide 602.

For example, FIG. 6 shows an amplitude profile 612 of a first wavelength of light and the amplitude profile 614 of a second wavelength of light that is longer than the first wavelength. When the moveable structure 604 is positioned as shown in FIG. 6, the first layer 610 interacts with the amplitude profiles 612 and 614 for both the first and second wavelengths, while the second layer 608 interacts with the amplitude profile 614 of the second wavelength, but not significantly with the amplitude profile 612 of the first wavelength. In this way, the second layer 608 does not significantly alter the effective refractive index change of the first wavelength, but does decrease the effective refractive index change experienced by the second wavelength as compared to instances in which the second layer 608 and the first layer 610 have the same refractive index. This in turn may reduce the wavelength dependency of the OM phase shifter 600 across a target range of wavelengths.

Additionally or alternatively, the moveable structure 604 may have an asymmetric cross-sectional shape (e.g., along a direction parallel to and/or a direction perpendicular to a direction of movement of the moveable structure 604) that may also be tailored to reduce the wavelength dependency of the OM phase shifter 600 across a target range of wavelengths. Similarly, the relative positioning of the moveable structure 604 and the waveguide 602 in a direction perpendicular to the direction that the actuator moves the moveable structure 604 may impact the wavelength dependency of the OM phase shifter 600. Specifically, this lateral positioning may be selected to adjust how movement of the moveable structure 604 (in conjunction with any of the other techniques described herein) impacts how the effective refractive index change experienced by light in the waveguide 602 varies as a function of wavelength.

Figure 7:
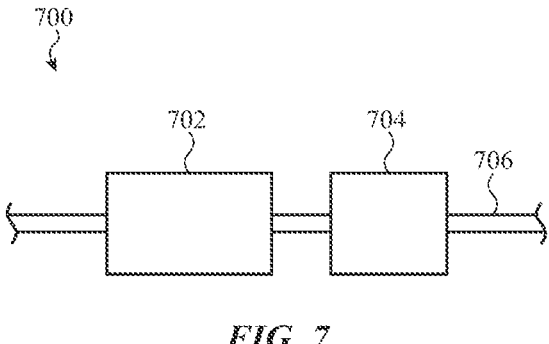
FIG. 7 shows a schematic diagram of a portion of a photonic integrated circuit that includes an optomechanical phase shifter and a tuning phase shifter as described herein.

While the OM phase shifters described above with respect to FIGS. 2A-6 may have reduced wavelength dependency, it may be possible that some of these designs still have a wavelength dependency larger than desired for a target wavelength range. In some variations of the photonic integrated circuits described herein, an OM phase shifter as described herein may be used in conjunction with a second phase shifter to provide a controllable phase tuner. FIG. 7 shows a schematic view of a controllable phase tuner 700 suitable for use with the photonic integrated circuits described herein. The controllable phase tuner 700 is configured to adjust the phase of light traveling through a length of a waveguide 706 (which may be supported on a substrate as described previously), and includes a first phase shifter 702 and a second phase shifter 704. The first phase shifter 702 is positioned to adjust the phase of light travelling through a first section of the length of the waveguide 706, and the second phase shifter 704 is positioned to adjust the phase of light traveling through a second section of the waveguide 706.

The controllable phase tuner 700 includes a controller (such as any of the controllers discussed previously) that is configured to control both the first phase shifter 702 and the second phase shifter 704. Specifically, the first phase shifter 702 is controlled using a wavelength-independent control signal, such that the control signal used to operate the first phase shifter 702 is the same regardless of the wavelength of light being modulated by the first phase shifter 702. For example, the first phase shifter 702 may be an OM phase shifter configured as a binary switch as described previously (e.g., where the OM phase shifter is either turned "off" by placing a moveable structure in a first position or turned "on" by placing the moveable structure in a second position). Accordingly, the wavelength-independent control signal has two output levels: a first output level that turns the first phase shifter 702 on and a second output level that turns the phase shifter 702 off.

The first phase shifter 702 will adjust the phase of light traveling through the first section of the waveguide by a first amount. If the first phase shifter 702 has a wavelength dependency, this first amount will vary as a function of the wavelength traveling through the waveguide 706. To correct for this, the second phase shifter 704 may be controlled using a wavelength-dependent control signal, such that the control signal that is applied to the second phase shifter 704 is selected based on the wavelength of light being modulated by the second phase shifter 704.

The second phase shifter 704 may be any suitable phase shifter capable of selectively varying the refractive index of the corresponding length of the waveguide 706 across a range of values (e.g., a thermo-optic phase shifter, a carrier-based phase shifter, or certain configurations of optomechanical phase shifters). The second phase shifter 704 will adjust the phase of light traveling through the first section of the waveguide by a second amount. Accordingly, if it is desirable for the controllable phase tuner 700 to provide a target amount of phase shift for a target wavelength of light, the wavelength-dependent signal is selected such that the sum of the first and second amounts of phase shift provided by the first and second phase shifters 702, 704 equal the target amount for the target wavelength of light.

The controller may determine a target wavelength of light passing through the waveguide 706, and may determine the wavelength-dependent control signal based on this wavelength. In some instances, the controller may receive an indication of a wavelength of light being generated by a light source (e.g., of a light source unit as described in more detail below), and may set this wavelength as the target wavelength. In some instances, the controller may control the light source to generate light at the target wavelength, and then may select the wavelength-dependent control signal for the second phase shifter 704 based on the target wavelength. As the waveguide 706 receives light of the target wavelength from the light source, the controllable phase tuner 700 may provide a target amount of phase shift using the first phase shifter 702 (controlled by the wavelength-independent control signal) and the second phase shifter 704 (controlled by the wavelength-dependent control signal). The controller may update the target wavelength as it activates a new light source (or controls the current light source to generate a new wavelength), and will select a new wavelength-dependent control signal based on the new target wavelength. As the waveguide 706 receives light of the updated target wavelength from the light source, the controllable phase tuner 700 may still provide a target amount of phase shift using the first phase shifter 702 (controlled by the wavelength-independent control signal) and the second phase shifter 704 (controlled by the updated wavelength-dependent control signal). In this way, although the waveguide 706 may receive different light of different wavelengths at different times, the controllable phase tuner 700 may still provide the same target amount of phase shift by updating the wavelength-dependent control signal.

In these embodiments, the second phase shifter 704 may act as a tuning phase shifter to provide a phase shift correction to the first phase shifter 702. This value of this correction may be selected to be the difference between the target phase shift and the first amount of phase shift provided by the first phase shifter 702, which may be a relatively small correction compared to the first amount. When this is a relatively small correction, the second phase shifter 704 may correct the wavelength dependency of the first phase shifter 702 with little additional loss and/or power consumption.

In some variations, the first section of the waveguide 706 has an asymmetric cross-sectional shape. In some of these variations, the second section of the waveguide 706 has a symmetric cross-sectional shape. In these instances, the first phase shifter 702 adjusts the phase of light traveling through an asymmetric region of the waveguide (e.g., such as those described above with respect to FIGS. 4-5D) while the second phase shifter 704 of light traveling through a symmetric region of the waveguide (e.g., such as those described above with respect to FIGS. 4-5D). This may allow for a variety of different phase shifters to be used. For example, the first phase shifter 702 may be an OM phase shifter having a section of waveguides with an asymmetric cross-sectional shape. In some of these variations, the second phase shifter 704 is a carrier-based phase shifter, such as a PIN phase shifter or a PN phase shifter as discussed previously. In other variations, the second phase shifter 704 is a thermo-optic phase shifter.

The OM phase shifters (and controllable phase tuners) described herein may be used in a photonic integrated circuit to form a controllable switch. In general, a controllable switch includes a first coupler (e.g., a 1×2 coupler or a 2×2 coupler) that has a first input that acts as an input to the controllable switch, a first output, and a second output. The controllable switch further includes a second coupler (e.g., a 2×2 coupler) that has a first input, a second input, a first output, and a second output. The couplers described herein may include any suitable coupler that is capable of splitting light received at one or more inputs between two outputs, including, but not limited to, multi-mode interferometer couplers, adiabatic couplers, co-directional couplers, or the like. The first and second outputs act as outputs of the controllable switch. The controllable switch includes a first leg connecting a first output of the first coupler to a first input of the second coupler and a second leg connecting a second output of the first coupler to the second input of the second coupler.

The controllable switch includes a first OM phase shifter positioned and controllable to selectively provide a first amount of phase shift to light traveling through one of the first leg or the second leg. The second OM phase shifter is positioned and controllable to selectively provide a second amount of phase shift to light traveling through one of the first leg or the second leg. The first and second amounts of phase shifts may be the same, or may be different. Depending on the design of the switch, the first and second OM phase shifters may be positioned and controllable to provide the first and second amounts of phase shift, respectively, to the same leg or different legs. The first and second OM phase shifters are controllable (e.g., by a controller as described previously) to selectively route light received by the first input of the first coupler between the first output and the second output of the second coupler. Specifically, depending on which of the first and second OM phase shifters are activated, the controllable switch may route light from the first input of the first coupler to either i) only the first output of the second coupler, ii) only the second output of the second coupler, or iii) split between the first and second outputs of the second coupler.

Figure 8A:
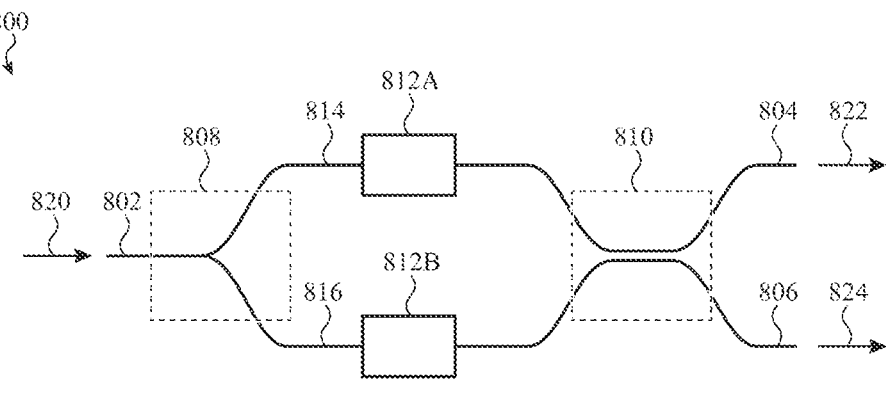
FIGS. 8A-8C depict a variation of a controllable switch that utilizes multiple optomechanical phase shifters as described herein.
Figure 8B:
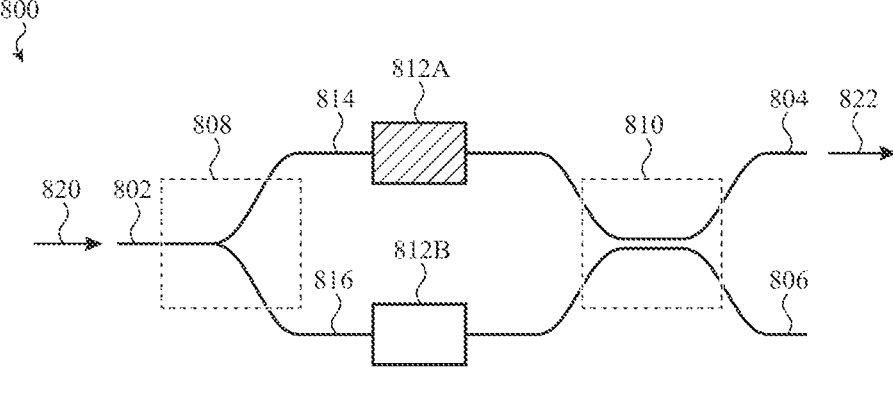
Figure 8C:
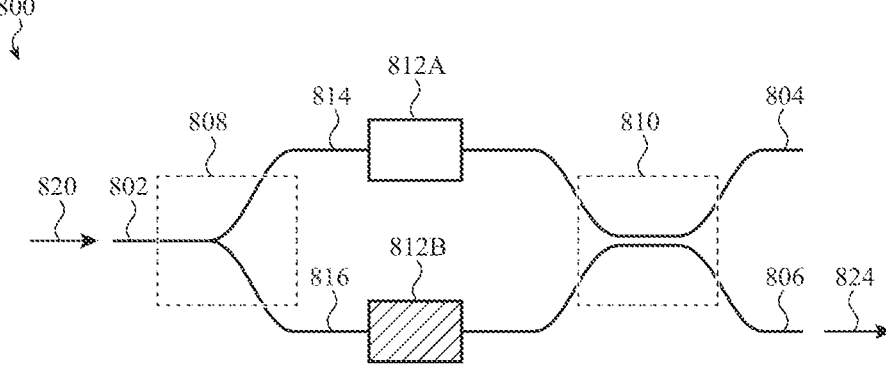

For example, FIGS. 8A-8C shows a variation of a 1×2 controllable switch 800 having a single input 802 and two outputs (a first output 804 and a second output 806). As shown there, the controllable switch has a 1×2 coupler 808 and a 2×2 coupler 810, where the 1×2 coupler 808 splits input 802 into a first leg 814 and a second leg 816 as outputs. Light received at the input 802 of the 1×2 controllable switch 800 is split by the 1×2 coupler 808 between the first leg 814 and the second leg 816 according to a predetermined splitting ratio. Similarly, the 2×2 coupler 810 receives light from the first leg 814 and second leg 816 as inputs and uses the first output 804 and the second output 806 of the 1×2 controllable switch 800 as outputs. Light received by each input of the 2×2 coupler 810 is split between the first output 804 and the second output 806 according to a corresponding predetermined splitting ratio. It should be appreciated that the input 802, first output 804, second output 806, first leg 814, and second leg 816 may each be a waveguide.

The 1×2 controllable switch 800 includes a first OM phase shifter 812A positioned to modulate the phase of light traveling through the first leg 814, and a second OM phase shifter 812B positioned to modulate the phase of light traveling through the second leg 816. A photonic integrated circuit incorporating the 1×2 controllable switch 800 may also include a controller (such as any of the controllers discussed previously) that can control operation of the first and second OM phase shifters 812A, 812B. Specifically, the first and second OM phase shifters 812A, 812B are each configured as a binary switch that can be controlled by the controller to either turn "off" by placing a moveable structure (not shown) in a first position or turn "on" by placing the moveable structure in a second position. Each of the first and second OM phase shifters 812A, 812B is configured to provide a target phase change when the OM phase shifter is turned on, which may control how light received at input 802 is routed between the outputs 804 and 806. It should be appreciated that if the wavelength-dependency of the phase change provided by one or both of the OM phase shifters 812A and 812B is larger than the requirements of a given system, the 1×2 controllable switch 800 may further control an additional phase shifter in one or both of the first and second legs 814 and 816, such as described above with the controllable phase tuner 700 of FIG. 7.

By adjusting the phase difference between the first leg 814 and the second leg 816, the 1×2 controllable switch 800 may take light received from the input 802 and selectively route light entirely to the first output 804, entirely to the second output 806, or simultaneously to both the first output 804 and the second output 806. For example, in some variations the 1×2 coupler 808 evenly splits light received at the input 802 between the first and second legs 814, 816, and the 2×2 coupler 810 evenly splits light received from each of its inputs evenly between the first and second outputs 804, 806. Additionally, each of the first and second OM phase shifters 812A, 812B (alone or in combination with an additional phase shifter) is configured to provide a target phase shift of π/2. In these variations, if both the OM phase shifters 812A and 812B are off (as shown in FIG. 8A), input light 820 received at the input 802 will be split between the first output 804 (which outputs a first output light 822) and the second output 806 (which outputs a second output light 824). If only the first OM phase shifter 812A is turned on (as shown in FIG. 8B), input light 820 received at the input 802 will be routed to the first output 804 as the first output light 822. Conversely, if only the second OM phase shifter 812B is turned on (as shown in FIG. 8C), input light 820 received at the input 802 will be routed to the second output 806 as the second output light 824.

In other variations, a controllable switch includes a 2×2 controllable switch. For example, FIGS. 9A-9D show a variation of a 2×2 controllable switch 900. The 2×2 controllable switch 900 is similar to the 1×2 controllable switch 800 of FIGS. 8A-8C, except that instead of a single input that feeds into a 1×2 coupler, the 2×2 controllable switch 900 includes a first input 902 and a second input 904 that feeds into a first 2×2 coupler 906 and a second 2×2 coupler 908. The first 2×2 coupler 906 receives light from the first input 902 and/or the second input 904 as inputs, and uses a first leg 910 and a second leg 912 as outputs. Similarly, the second 2×2 coupler 908 receives light from the first leg 910 and the second leg 912 as inputs and uses a first output 914 and a second output 916 of the 2×2 controllable switch 900 as outputs.

Light received by either the first input 902 or the second input 904 of the 2×2 controllable switch 900 is split by the first 2×2 coupler 906 between the first leg 910 and the second leg 912. The second 2×2 coupler 908 receives the light from the first leg 910 and second leg 912, and couples the light to the first output 914 and/or second output 916 (as described in more detail with respect to FIGS. 8A-8C). The 2×2 controllable switch 900 includes a first OM phase shifter 918A and a second OM phase shifter 918B that are each positioned to modulate the phase of light traveling through the first leg 910. A photonic integrated circuit incorporating the 2×2 controllable switch 900 may also include a controller (such as any of the controllers discussed previously) that can control operation of the first and second OM phase shifters 918A, 918B. The first and second OM phase shifters 918A, 918B are each configured as a binary switch that is either turned "off" by placing a moveable structure (not shown) in a first position or turned "on" by placing the moveable structure in a second position. Each of the first and second OM phase shifters 918A, 918B is configured to provide a target phase change when the OM phase shifter is turned on, which may control how light received at either the first input 902 or the second input 904 is routed between the first and second outputs 904 and 906. It should be appreciated that if the wavelength-dependency of the phase change provided by one or both of the OM phase shifters 918A and 918B is larger than the requirements of a given system, the 2×2 controllable switch 900 may further control an additional phase shifter positioned to modify the phase of light in one or both of the first and second legs 910, 912, such as described above with the controllable phase tuner 700 of FIG. 7.

By adjusting the phase difference between the first leg 910 and the second leg 912, the 2×2 controllable switch 900 may take light received from one of its inputs (e.g., the first input 902 or the second input 904) and selectively route light entirely to the first output 914, entirely to the second output 916, or simultaneously to both the first output 914 and the second output 916. In some examples, the first 2×2 coupler 906 is configured to evenly split light received at any of its inputs between the first and second legs 910, 912, and the second 2×2 coupler 908 evenly splits light received from each of its inputs evenly between the first and second outputs 914, 916. In some of these variations, each of the first and second OM phase shifters 918A, 918B (alone or in combination with an additional phase shifter) is configured to provide a target phase shift of π/2. In these variations, if both the OM phase shifters 918A and 918B are off (as shown in FIG. 9A), input light 920 received at one input (first input 902 in the example of FIG. 9A) is outputted to only one of the outputs (the second output 916 outputs a first output light 922 in the example of FIG. 9A). If both the OM phase shifters 918A and 918B are on as shown in FIG. 9B, the OM phase shifters 918A and 918B may collectively provide a phase shift of π and an input light 920 received at the same input (e.g., first input 902) will be outputted only to the other of the outputs (the first output 914 outputs a second output light 924 in the example of FIG. 9B). Conversely, when only one of the OM phase shifters 918A and 918B is on (e.g., the first OM phase shifter 918A in FIG. 9C or the second OM phase shifter 918B in FIG. 9D), input light 920 received at an input (e.g., first input 902), that light is split between the first and second outputs 914, 916, which output the first and second output light 922, 924 respectively.

In others of these variations, the first and second OM phase shifters 918A, 918B are configured to provide different phase shifts. In these instances the phase shifts provided by the OM phase shifters 918A, 918B are relatively close to each other (e.g., within 30% of each other), but collectively will provide a phase shift of π when both phase shifters 918A and 918B are on. For example, the first OM phase shifter 918A may provide a phase shift of 0.9*π/2 and the second OM phase shifter 918B may provide a phase shift of 1.1*π/2. This may help to account for wavelength-based variations in the phase shift provided by the OM phase shifters 918A, 918B. When it is desirable to split light between the first and second outputs 914, 916, the first OM phase shifter 918A may be turned on as depicted in FIG. 9C when used with a first set of wavelengths, while the first OM phase shifter 918A may be turned on as depicted in FIG. 9C when used with a second set of wavelengths that has shorter wavelengths than those of the first set of wavelengths. In these instances, a wavelength dependency in the first OM phase shifter 918A may cause the actual phase shift provided by the first OM phase shifter 918A to the first set of wavelengths to increase, which may bring the actual phase shift closer to π/2. Similarly, a wavelength dependency in the second OM phase shifter 918B may cause the actual phase shift provided by the second OM phase shifter 918B to the second set of wavelengths to decrease, which may also bring this actual phase shift closer to π/2. As a result, the 2×2 controllable switch will have a more uniform performance across the first and second sets of wavelengths (which may be generated by a light source unit as discussed below).

Figure 10:
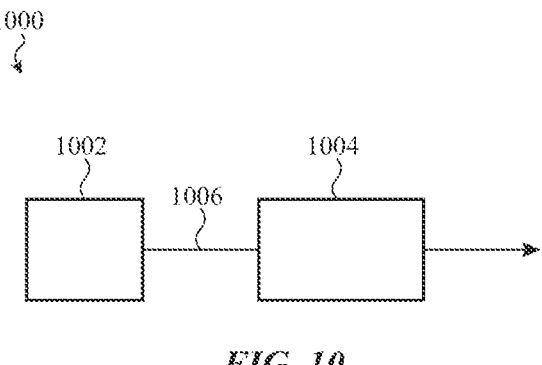
FIG. 10 shows a schematic diagram of a portion of an optical system as described herein that includes a light source unit.

As mentioned above, the OM phase shifters, as well as the controllable phase tuners and controllable switches incorporating OM phase shifters, described herein may be configured to modulate the phase of light across a wide range of wavelengths. Accordingly, in some instances the OM phase shifters as described here may be used in an optical system with a light source unit that is configured to generate light in a predetermined range of wavelengths, and the OM phase shifter may be used to modulate the phase of light generated by the light source unit. For example, FIG. 10 shows a schematic diagram of an optical system 1000 including a light source unit 1002 that is optically coupled to an OM phase shifter 1004 (which may be part of a controllable phase tuner and/or controllable switch as described previously) via a waveguide 1006. The OM phase shifter 1004 is configured to change the phase of the light traveling through waveguide 1006 in any manner as described previously.

The light source unit 1002 includes a set of light sources (not shown), each of which is selectively operable to emit light at a corresponding set of wavelengths. Each light source may be any component capable of generating light at one or more particular wavelengths, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times). The set of light sources may include any suitable combination of light sources, and collectively may be operated to generate light at any of a plurality of different wavelengths.

To the extent the light source unit 1002 is capable of generating multiple different wavelengths, the light source unit 1002 may be configured to generate different wavelengths of light simultaneously and/or sequentially. The light source unit 1002 may be integrated into a photonic integrated circuit that includes the OM phase shifter 1004 or may be separate from the photonic integrated circuit and couple light into the photonic integrated circuit. Additionally, the optical system may include additional components (not shown) between the light sources of light source unit 1002 and the OM phase shifter 1004, such that the light initially generated by the light source unit 1002 may be altered before it reaches the OM phase shifter 1004 as input light.

When the OM phase shifter 1004 is discussed as operating over a range of wavelengths (e.g., a "target range of wavelengths"), it should be appreciated that in some instances the light source unit 1002 need not be able to generate the entire spectrum within that range (e.g., every wavelength between the longest and shortest wavelength of the range). Instead, the light source unit 1002 may generate a discrete number or set of wavelengths within the range.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A photonic integrated circuit comprising:
a substrate having a top surface;
a waveguide supported on the top surface of the substrate; and
an optomechanical phase shifter configured to change a phase of light traveling through a length of the waveguide, wherein:

the optomechanical phase shifter comprises:

a moveable structure; and an actuator configured to move the moveable structure relative to the length of the waveguide between a first position and a second position; and the length of the waveguide has an asymmetric cross-sectional shape that is configured such that a distance between the moveable structure and a centroid of an amplitude profile of a mode of light traveling through the length of the waveguide increases as a function of wavelength.

2. The photonic integrated circuit of claim 1, wherein the asymmetric cross-sectional shape of the length of the waveguide is asymmetric in a direction parallel to the top surface of the substrate.

3. The photonic integrated circuit of claim 2, wherein the asymmetric cross-sectional shape of the length of the waveguide has a first section with a first height and a second section with a second height that is smaller than the first height.

4. The photonic integrated circuit of claim 2, wherein the moveable structure is moveable in between the first position and the second position in the direction parallel to the top surface of the substrate.

5. The photonic integrated circuit of claim 2, wherein the asymmetric cross-sectional shape of the length of the waveguide is asymmetric in a direction perpendicular to the top surface of the substrate.

6. The photonic integrated circuit of claim 1, wherein:

the waveguide comprises a first symmetric region positioned on a first side of the length of the waveguide; and the first symmetric region of the waveguide has a symmetric cross-sectional shape.

7. The photonic integrated circuit of claim 6, wherein:

the waveguide comprises a first transition region positioned between the first symmetric region of the waveguide and the length of the waveguide; and the first transition region has a cross-sectional shape that changes between the symmetric cross-sectional shape of the first symmetric region of the waveguide and the asymmetric cross-sectional shape of the length of the waveguide.

8. The photonic integrated circuit of claim 6, wherein:

the first symmetric region of the waveguide is configured as a strip waveguide.

9. The photonic integrated circuit of claim 6, wherein:

the waveguide comprises a second symmetric region positioned on a second side of the length of the waveguide; and the second symmetric region of the waveguide has a symmetric cross-sectional shape and is configured as a symmetric rib waveguide.

10. The photonic integrated circuit of claim 9, further comprising an additional phase shifter positioned to change the phase of light traveling through the second symmetric region.

11. The photonic integrated circuit of claim 6, wherein:

the first symmetric region of the waveguide is configured as a symmetric rib waveguide.

12. A photonic integrated circuit, comprising:

a substrate;

a waveguide supported on the substrate;

a controllable phase tuner configured to adjust a phase of light traveling through a length of the waveguide by a target amount; and a controller, wherein:

the controllable phase tuner comprises:

a first phase shifter positioned to adjust the phase of light traveling through a first section of the length of the waveguide; and a second phase shifter positioned to adjust the phase of light traveling through a second section of the length of the waveguide;

the first phase shifter comprises:

a moveable structure; and an actuator configured to move the moveable structure relative to the length of the waveguide between a first position and a second position;

the first section of the length of the waveguide has an asymmetric cross-sectional shape configured to reduce a wavelength dependence of a phase shift generated by the first phase shifter;

the controller controls the first phase shifter using a wavelength-independent control signal to adjust the phase of light traveling through the first section of the length of the waveguide by a first amount;

the controller controls the second phase shifter using a wavelength-dependent control signal to adjust the phase of light traveling through the first section of the length of the waveguide by a second amount; and the target amount is equal to a sum of the first amount and the second amount.

13. The photonic integrated circuit of claim 12, wherein the controller:

determines a target wavelength of light; and selects the wavelength-dependent control signal based on the target wavelength.

14. The photonic integrated circuit of claim 12, wherein:

the second section of the length of the waveguide has a symmetric cross-sectional shape.

15. The photonic integrated circuit of claim 14, wherein the second phase shifter is a carrier-based phase shifter.

16. A photonic integrated circuit comprising:

a controllable switch comprising:

a first coupler having a first input, a first output, and a second output;

a second coupler having a first input, a second input, a first output, and a second output;

a first leg connecting the first output of the first coupler to the first input of the second coupler;

a second leg connecting the second output of the first coupler to the second input of the second coupler;

a first optomechanical phase shifter positioned and controllable to selectively provide a first amount of phase shift to light traveling through one of the first leg or the second leg; and a second optomechanical phase shifter positioned and controllable to selectively provide a second amount of phase shift to light traveling through one of the first leg or the second leg; wherein:

the first amount of phase shift is provided to a first section of a length of a waveguide having an asymmetric cross-sectional shape, the asymmetric cross-sectional shape configured to reduce a wavelength dependence of the first amount of phase shift;

the first optomechanical phase shifter and the second optomechanical phase shifter are controllable to selectively route light received by the first input of the first coupler between the first output and the second output of the second coupler.

17. The photonic integrated circuit of claim 16, wherein:

the first coupler is a 1×2 coupler;

the first optomechanical phase shifter is positioned and controllable to provide the first amount of phase shift to light traveling through the first leg; and the second optomechanical phase shifter is positioned and controllable to provide the second amount of phase shift to light traveling through the first leg.

18. The photonic integrated circuit of claim 16, wherein:

the first coupler is a 2×2 coupler and has a second input;

the first optomechanical phase shifter is positioned and controllable to provide the first amount of phase shift to light traveling through the first leg; and the second optomechanical phase shifter is positioned and controllable to provide the second amount of phase shift to light traveling through the second leg.

19. The photonic integrated circuit of claim 18, wherein the first amount of phase shift is equal to the second amount of phase shift.

* * * * *